US010122774B2

(12) United States Patent
Dash et al.

(10) Patent No.: US 10,122,774 B2
(45) Date of Patent: Nov. 6, 2018

(54) EPHEMERAL INTERACTION SYSTEM

(71) Applicant: Microsoft Technology Licensing, LLC, Redmond, WA (US)

(72) Inventors: Pradeepta Dash, Santa Clara, CA (US); Elizabeth Ethel Burstein, San Francisco, CA (US); Nash Raghavan, Santa Clara, CA (US); Mark Hull, San Jose, CA (US); Gaganpreet Singh Shah, Union City, CA (US); Jayant Sai, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 14/807,562

(22) Filed: Jul. 23, 2015

(65) Prior Publication Data

US 2016/0381092 A1 Dec. 29, 2016

Related U.S. Application Data

(60) Provisional application No. 62/186,290, filed on Jun. 29, 2015.

(51) Int. Cl.
*H04L 29/06* (2006.01)
*H04L 12/58* (2006.01)
*G06Q 10/10* (2012.01)

(52) U.S. Cl.
CPC ......... *H04L 65/403* (2013.01); *G06Q 10/109* (2013.01); *H04L 51/32* (2013.01)

(58) Field of Classification Search
CPC ............ G06F 3/0482; G06F 3/0481; G06F 17/30867; G06Q 10/109; G06Q 50/01; G06Q 10/1095; G06Q 30/0255; G06Q 30/0269; H04L 51/32; H04L 65/403; H04L 51/12; H04L 67/22; H04L 67/306
See application file for complete search history.

(56) References Cited

U.S. PATENT DOCUMENTS

| | | | |
|---|---|---|---|
| 2002/0076025 A1* | 6/2002 | Liversidge | G06Q 10/10 379/202.01 |
| 2006/0270419 A1* | 11/2006 | Crowley | H04M 3/42 455/456.2 |
| 2008/0070593 A1* | 3/2008 | Altman | H04L 63/102 455/457 |
| 2010/0016069 A1* | 1/2010 | Herrmann | G07F 17/32 463/25 |

(Continued)

*Primary Examiner* — Tadeese Hailu
(74) *Attorney, Agent, or Firm* — Schwegman Lundberg & Woessner, P.A.

(57) ABSTRACT

Techniques for enabling members that have interacted physically to interact thereafter via an online social networking service are described. According to various embodiments, it is determined that a first member and a second member of an online social networking service physically interacted at an interaction location at an interaction time, and a specific time interval commencing at the interaction time is calculated. Thereafter, an ephemeral prompt is displayed to the first member, during the specific time interval, indicating that the first member physically interacted with the second member, and inviting the first member to message the second member via the online social networking service. The ephemeral prompt is prevented from being displayed subsequent to expiration of the specific time interval.

20 Claims, 9 Drawing Sheets

(56) References Cited

U.S. PATENT DOCUMENTS

| | | | | |
|---|---|---|---|---|
| 2010/0082247 A1* | 4/2010 | Klein | G01C 21/20 |
| | | | | 701/533 |
| 2010/0149036 A1* | 6/2010 | Rosenberg | G06Q 30/02 |
| | | | | 342/357.31 |
| 2011/0321132 A1* | 12/2011 | Slingerland | H04N 21/4788 |
| | | | | 726/4 |
| 2012/0179764 A1* | 7/2012 | Erdal | G06Q 50/01 |
| | | | | 709/206 |
| 2012/0239618 A1* | 9/2012 | Kung | G06F 21/6218 |
| | | | | 707/621 |
| 2012/0290950 A1* | 11/2012 | Rapaport | H04L 51/32 |
| | | | | 715/753 |
| 2013/0095801 A1* | 4/2013 | Kermoian | H04M 1/72597 |
| | | | | 455/414.1 |
| 2013/0132477 A1* | 5/2013 | Bosworth | G06Q 50/01 |
| | | | | 709/204 |
| 2013/0254408 A1* | 9/2013 | Sreenivasan | G06Q 50/01 |
| | | | | 709/227 |
| 2014/0025748 A1* | 1/2014 | Mallet | G06Q 50/01 |
| | | | | 709/204 |
| 2014/0317201 A1* | 10/2014 | McNeil | H04L 51/32 |
| | | | | 709/206 |
| 2015/0040015 A1* | 2/2015 | Jindal | H04L 51/32 |
| | | | | 715/735 |
| 2015/0269393 A1* | 9/2015 | Lauder | G06F 21/6245 |
| | | | | 726/30 |
| 2016/0014677 A1* | 1/2016 | Chen | H04W 48/16 |
| | | | | 455/434 |
| 2016/0212230 A1* | 7/2016 | Schneider | H04L 67/22 |
| 2016/0294894 A1* | 10/2016 | Miller | H04L 51/32 |

* cited by examiner

EPHEMERAL INTERACTION SYSTEM

RELATED APPLICATION

The present application claims the benefit of priority to U.S. Provisional Application No. 62/186,290, filed Jun. 29, 2015, which is incorporated by reference herein in its entirety.

TECHNICAL FIELD

The present application relates generally to data processing systems and, in one specific example, to techniques for enabling members that have interacted physically to interact thereafter via an online social networking service.

BACKGROUND

Online social network services such as LinkedIn® are becoming increasingly popular, with many such websites boasting millions of active members. Each member of the online social network service is able to upload an editable member profile page to the online social network service. The member profile page may include various information about the member, such as the member's biographical information, photographs of the member, and information describing the member's employment history, education history, skills, experience, activities, and the like. Such member profile pages of the networking website are viewable by, for example, other members of the online social network service.

BRIEF DESCRIPTION OF THE DRAWINGS

Some embodiments are illustrated by way of example and not limitation in the figures of the accompanying drawings in which.

DETAILED DESCRIPTION

Example methods and systems for enabling members that have interacted physically to interact thereafter via an online social networking service are described. In the following description, for purposes of explanation, numerous specific details are set forth in order to provide a thorough understanding of example embodiments. It will be evident, however, to one skilled in the art that the embodiments of the present disclosure may be practiced without these specific details.

According to various example embodiments, a system is configured to determine when users have physically interacted (e.g., on the street, in a restaurant, at work, at a conference, etc.), and then display an ephemeral prompt via a computing device that encourages the users to interact with each other via an online social networking service such as LinkedIn®. The prompt is ephemeral since it is only displayed for a specific ephemeral time interval (e.g., 24 hours) after the users have physically interacted.

In some embodiments, during the ephemeral time interval (e.g., 24 hours) after the users have physically interacted, the system dynamically adjusts or lowers the threshold for communication or connection between the members on the online social networking service, providing a light-weight, relaxed, or otherwise easier user flow for interaction for a limited time than would otherwise be the case. After expiration of the ephemeral time interval, default interaction or privacy settings are restored. For example, in some cases, the online social networking service LinkedIn® prevents a first user from messaging a second user (unless they are already connected) or prevents a first user from transmitting a connection invitation to a second user, unless the first user can provide a current email address of the second user. Accordingly, the system may allow the first user to message or transmit a connection invitation to a second user (without providing a current email address of the second user) only for the specific ephemeral time interval after the physical interaction, and once the ephemeral time interval has expired, the first user is again prevented from messaging or transmitting a connection invitation to the second user. As another example, in some cases, the LinkedIn® online social networking service prevents a first user from viewing the member profile page of a second user, or prevents the first user from viewing the full, complete version of the member profile page of the second user (e.g., allowing them to only view a truncated version or snapshot of the second user's member profile page), unless the users are connected or unless the first user can provide a current email address of the second user. Thus, the system may allow the first user to view the full profile page of the second user (without providing a current email address of the second user) only for the specific ephemeral time interval after the physical interaction, and once the ephemeral time interval has expired, the first user is again prevented from viewing the full, complete version of the member profile page of the second user. Thus, the system may make it easier for the users to interact, communicate, or otherwise obtain information from—or about—each other, only for a specific ephemeral time interval after the physical interaction.

Figure 1:
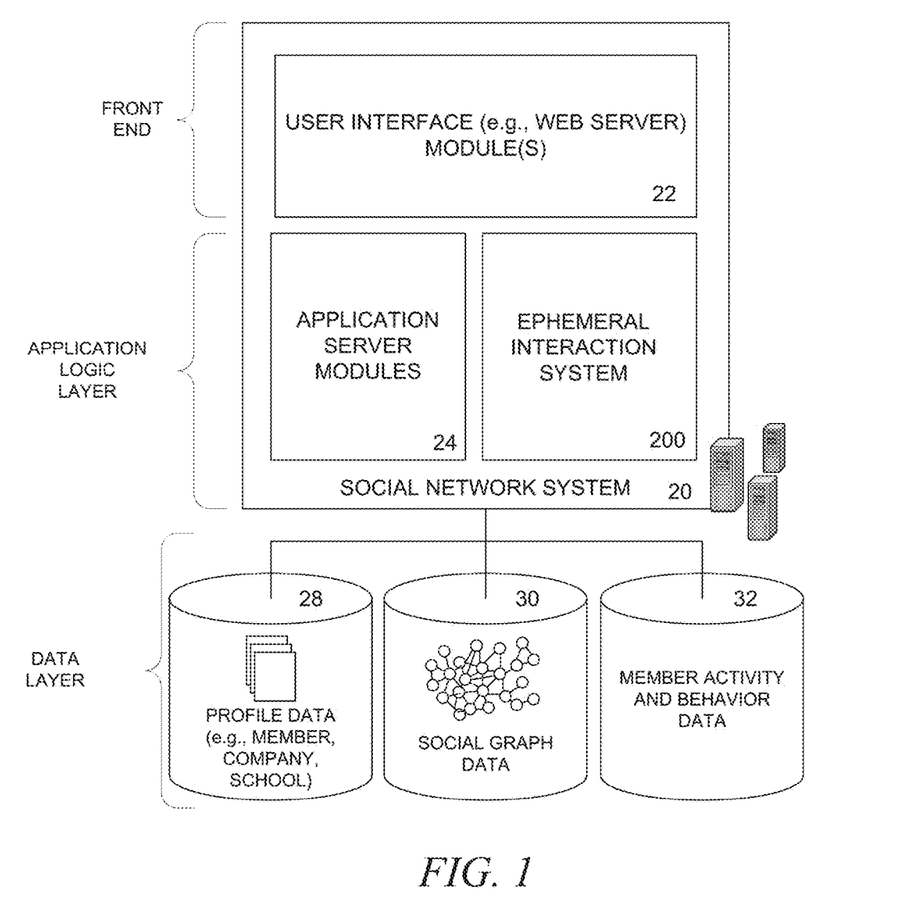
FIG. 1 is a block diagram showing the functional components of a social networking service, consistent with some embodiments of the present disclosure.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as an ephemeral interaction system 200. The ephemeral interaction system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
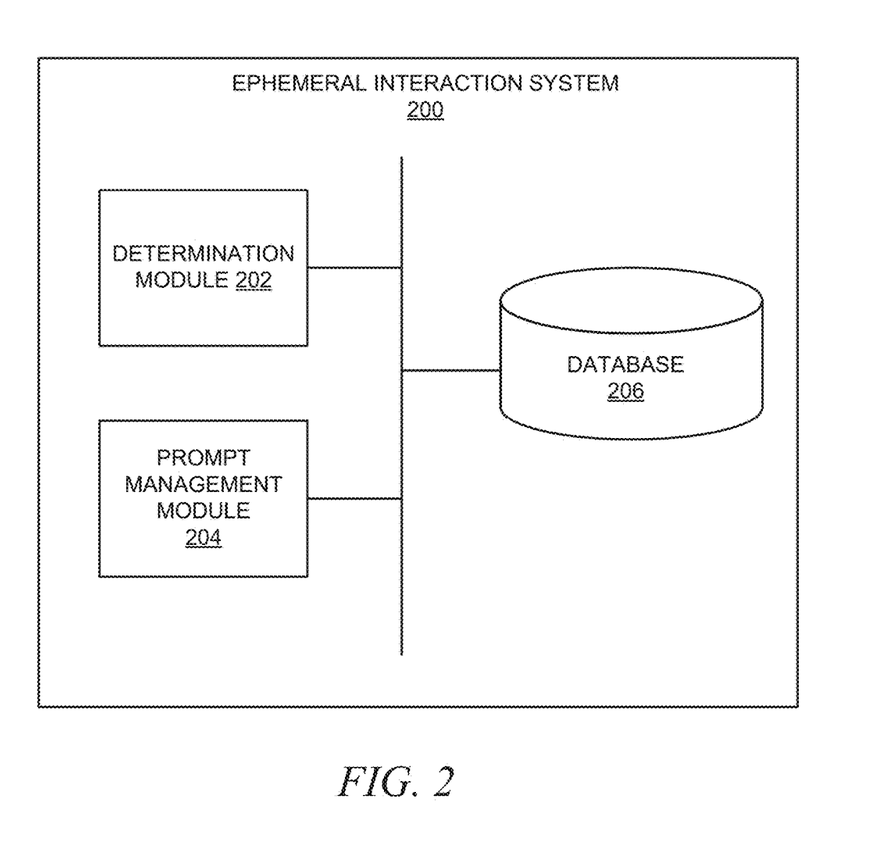
FIG. 2 is a block diagram of an example system, according to various embodiments.

Turning now to FIG. 2, an ephemeral interaction system 200 includes a determination module 202, a prompt management module 204, and a database 206. The modules of the ephemeral interaction system 200 may be implemented on or executed by a single device or on separate devices interconnected via a network (e.g., one or more client machines or application servers). The operation of each of the aforementioned modules of the ephemeral interaction system 200 will now be described in greater detail in conjunction with the various figures.

Figure 3:
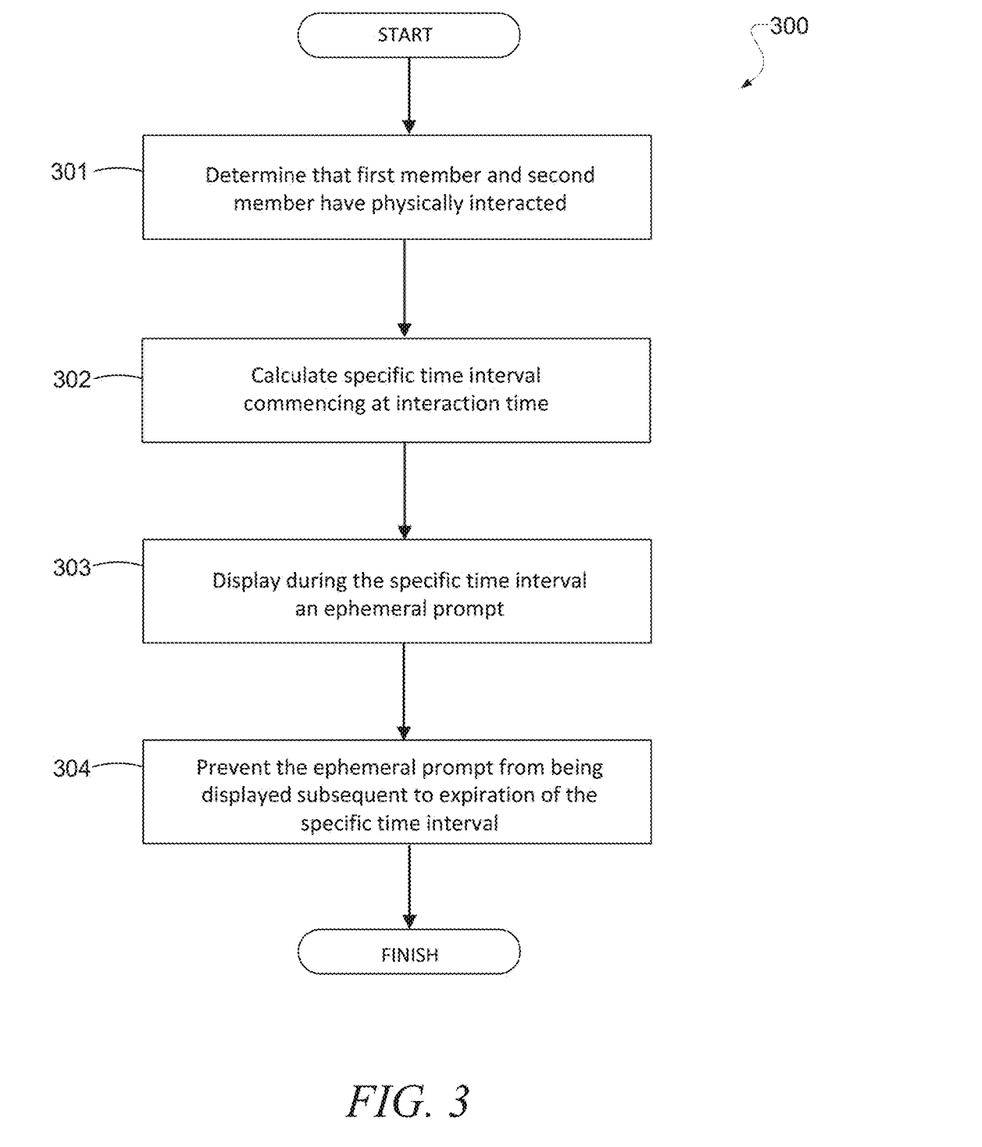
FIG. 3 is a flowchart illustrating an example method, according to various embodiments.

FIG. 3 is a flowchart illustrating an example method 300, consistent with various embodiments described herein. The method 300 may be performed at least in part by, for example, the ephemeral interaction system 200 illustrated in FIG. 2 (or an apparatus having similar modules, such as one or more client machines or application servers). In operation 301, the determination module 202 determines that a first member and a second member of an online social networking service physically interacted at an interaction location and at an interaction time. In operation 302, the prompt management module 204 calculates a specific ephemeral time interval (e.g., 24 hours, 2 days, 1 week, etc.) commencing at the interaction time referred to in operation 301. For example, the ephemeral interaction system 200 may display a user interface enabling and operator of the ephemeral interaction system 200 (e.g., an IT administrator or personal associated with an online social networking service) to configure the aforementioned ephemeral time interval. In operation 303, the prompt management module 204 displays to the first member, during the specific ephemeral time interval calculated in operation 302, an ephemeral prompt indicating that the first member physically interacted with the second member, and inviting the first member to message the second member via the online social networking service. In operation 304, the prompt management module 204 prevents the ephemeral prompt displayed in operation 303 from being displayed subsequent to expiration of the specific ephemeral time interval. In some embodiments, the prompt management module 204 prevents the first member from connecting to or messaging the second member subsequent to expiration of the specific ephemeral time interval (unless the first member is connected to the second member and can provide a current email address of the second member). It is contemplated that the operations of method 300 may incorporate any of the other features disclosed herein. Various operations in the method 300 may be omitted or rearranged, as necessary.

Figure 4:
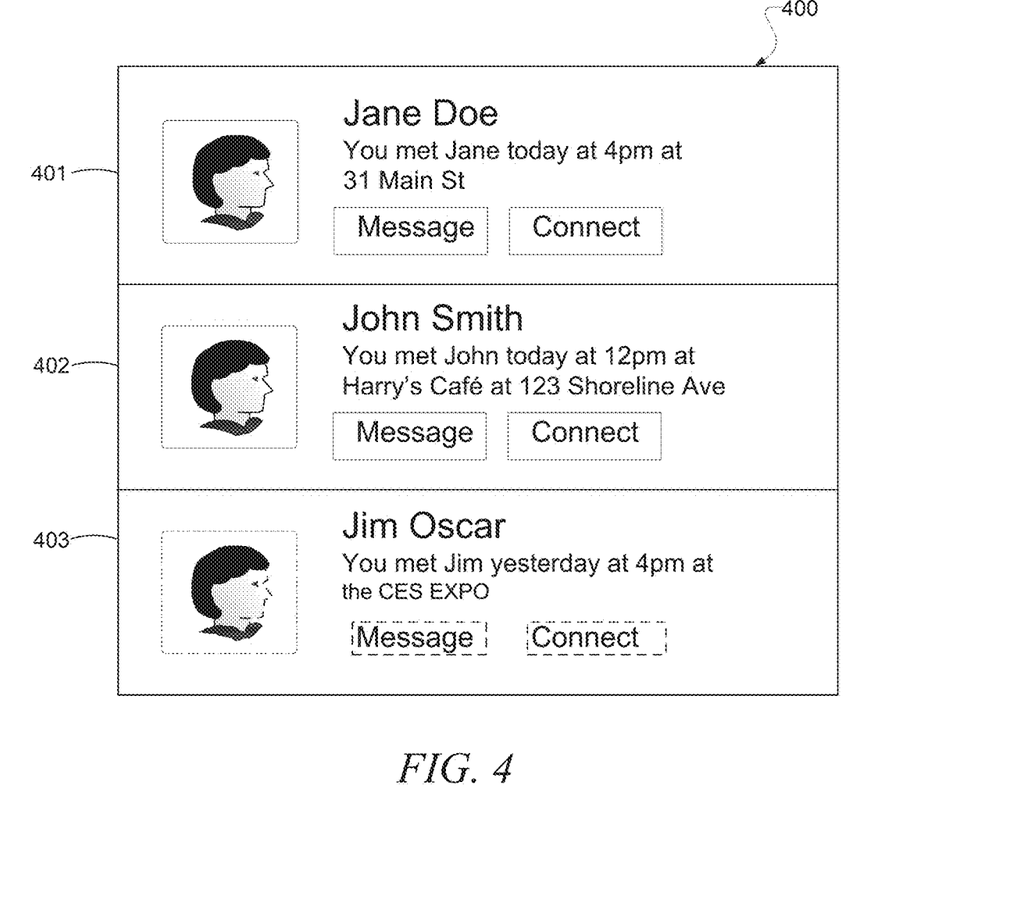
FIG. 4 illustrates an example portion of a user interface, according to various embodiments.

In some embodiments, the ephemeral prompt identifies the second member, the interaction time, the interaction location, a link to view a member profile page of the second member, a link to message the second member, and a link to connect to the second member. For example, FIG. 4 illustrates a window 400 including multiple ephemeral prompts 401-403, where each prompt identifies a user that the viewer interacted with, the time and location of their interaction, and a link to connect to and message that user. The prompts all display interactions that have occurred within the past 24 hours (or whatever the specified ephemeral time interval is), and may be sorted chronologically, with the most recent interaction appearing highest. Thus, in some embodiments, the system 200 will remove ephemeral prompts from display once they have expired (or, put another way, once the specified ephemeral time interval with regards to that underlying interaction has expired). In some embodiments, the system 200 may modify the appearance of displayed ephemeral prompts just before they expire (or, put another way, just before the specified ephemeral time interval with regards to that underlying interaction expires). For example, such a prompt 403 may include dashed lines, different shading, appear to fade, appear lighter, appear more transparent or opaque, etc., in comparison to the other prompts 401 and 402, for a predetermined time interval (e.g., 1 hour or 1 minute) before expiration.

The ephemeral prompt may be displayed on a webpage, in a web browser, in a mobile application installed on a mobile device, or in an email or message. In some embodiments, the information normally included in the aforementioned prompts may be displayed in other locations associated with the second member, such as in a search results page listing the second member, on member profile page of the second member, other any other webpages that describe the second member. The messages described herein may be any type of electronic message, including an e-mail, text message (e.g., a short messaging service (SMS) message, a multimedia messaging service (MMS) message, etc.), an instant message associated with an online social network (e.g., Facebook®, LinkedIn®, Wechat®, WhatsApp®, etc.), a chat message associated with an online chat service, and so on.

In some embodiments, if the prompt management module 204 detects that a first member has selected, during a specific ephemeral time interval, a link in an ephemeral prompt to message or connect to a second member, then the prompt management module 204 transmit the message or a connection invitation to the second member, and the message received by (and displayed to) the second member identifies the first member, the relevant interaction time, the relevant interaction location, a link to view a member profile page of the first member, or a link to accept the connection invitation from the first member.

In some embodiments, the determination module 202 determines that a first member and a second member physically interacted by determining that mobile devices associated with the first and second member are located within a predetermined distance of each other (e.g., 1-3 feet) for at least a predetermined time period (e.g., 1 minute). The determination module 202 may determine that mobile devices associated with the first and second member are located near each other using any techniques known to those skilled in the art, including comparing data obtained from a geo-location system of each mobile device, a global positioning system (GPS) of each mobile device, a near field communication (NFC) system of each mobile device, a Bluetooth system of each mobile device, etc.

In some embodiments, the determination module 202 determines that the first member and the second member physically interacted by determining that the first member and the second member are listed on a check-in status message posted on an online social network (e.g., LinkedIn®, Facebook®, Twitter®, Foursquare®, etc.), the check-in status message having a check-in location and check-in meeting time corresponding to an interaction location and an interaction time of a physical interaction. For example, if a post on Facebook says "Mary and Scott were at Harold's Barbecue Restaurant at 123 Main Street at 4.30 pm 15/1/99", then the determination module 202 may access this post (e.g., via crawling the post or accessing it through a relevant API), identify a check-in location in the post (e.g., Harold's Barbecue Restaurant at 123 Main Street) and a check-in time in the post (e.g., 4.30 pm 15/1/99), and classify these as an interaction location and an interaction time, respectively, of a physical interaction between Mary and Scott.

In some embodiments, the determination module 202 determines that the first member and the second member physically interacted by determining that the first member and the second member are listed on an electronic calendar invite (e.g., an Outlook® invite) associated with a meeting location and a meeting time corresponding to an interaction location and an interaction time of a physical interaction. For example, if an Outlook® invites Mary and Scott to a meeting at Harold's Barbecue Restaurant at 123 Main Street at 4.30 pm 15/1/99, then the determination module 202 may access this invite (e.g., via scanning each user's Outlook® or other calendar data), identify a meeting location in the invite (e.g., Harold's Barbecue Restaurant at 123 Main Street) and a meeting time in the invite (e.g., 4.30 pm 15/1/99), and classify these as an interaction location and an interaction time, respectively, of a physical interaction between Mary and Scott.

In some embodiments, the determination module 202 may display a settings user interface and receive, via the settings user interface, a user specification of physical interaction criteria for detecting physical interactions between members. The physical interaction criteria may correspond to at least one of a requisite physical interaction distance and a requisite physical interaction time. Thereafter, the determination module 202 determines that the first member and the second member physically interacted by determining that the first member was located within the requisite physical interaction distance of the second member for the requisite physical interaction time. Thus, the user may specify that they only want to see ephemeral prompts for significant interactions where they were, for example, within 3 feet of another user for at least 10 minutes.

According to various example embodiments, the determination module 202 is configured to determine the likelihood and/or strength of physical interaction, based on the detected distance between the mobile devices of the first and second member, or how long the mobile devices of the first and second member are located near each other. For example, if the first and second mobile devices come within 1 feet of each other, then the likelihood and/or strength of physical interaction is greater than if the first and second mobile devices come within 5 feet of each other. Similarly, if the first and second mobile devices are located within 3 feet of each other for 1 hour, then the likelihood and/or strength of physical interaction is greater than if the first and second mobile devices are located within 3 feet of each other for 1 minute. The determination module 202 may detect the distance between mobile devices, or how long the mobile devices are located within a given distance of each other, using any techniques known to those skilled in the art, including comparing and analyzing location data obtained from a geo-location system of each mobile device, a global positioning system (GPS) of each mobile device, a near field communication (NFC) system of each mobile device, a Bluetooth system of each mobile device, etc.

In some embodiments, the determination module 202 may determine the likelihood and/or strength of physical interaction based on a size of a meeting that included the relevant members. For example, if the determination module 202 determines that a first member and the second member physically interacted, such as by determining that the first member and the second member are listed together on an electronic calendar meeting invite or a check-in status message, then the determination module 202 may identify how many other users are listed on the electronic calendar meeting invite or the check-in status message, and the smaller the number, the greater the likelihood and/or strength of physical interaction.

In some embodiments, the calculated likelihood or strength of physical interaction may be used to rank ephemeral prompts, or to rank messages or connection invitations activated through ephemeral prompts. For example, if a number of ephemeral prompts are displayed, then they may be ranked based on chronological order (as illustrated in FIG. 4), or they may be ranked based on the likelihood or strength of the physical interaction underlying each prompt (e.g., strongest or most likely physical interaction is displayed highest). As another example, if the user receives a number of messages or connection invitations from senders associated with recent physical interactions (e.g., as a result of each sender selecting an ephemeral prompt), then these messages or connection invitations may be ranked based on the likelihood of physical interaction underlying each message or connection invitation (e.g., strongest or most likely physical interaction is displayed highest).

Figure 5:
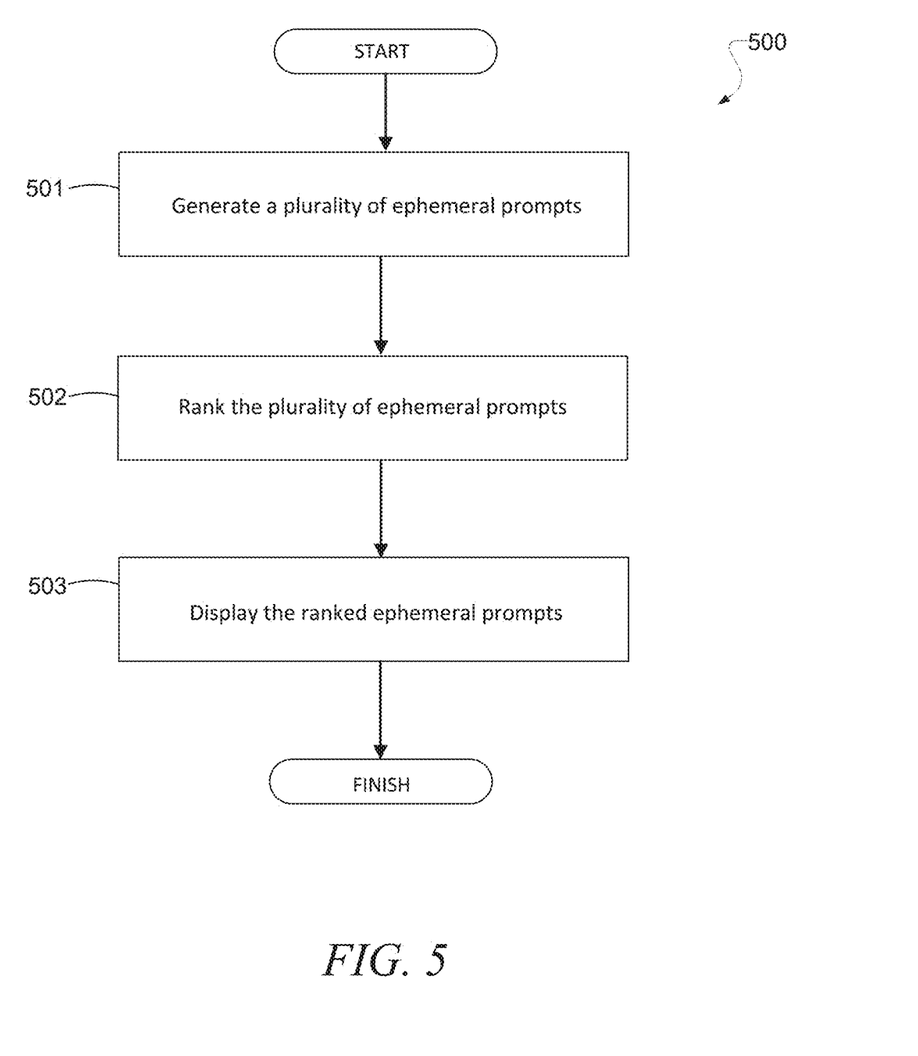
FIG. 5 is a flowchart illustrating an example method, according to various embodiments.

FIG. 5 is a flowchart illustrating an example method 500, consistent with various embodiments described herein. The method 500 may be performed at least in part by, for example, the ephemeral interaction system 200 illustrated in FIG. 2 (or an apparatus having similar modules, such as one or more client machines or application servers). In operation 501, the prompt management module 204 generates a plurality of ephemeral prompts indicating that a given member physically interacted with a plurality of additional members, and inviting the given member to message the plurality of additional members via the online social networking service. In operation 502, the prompt management module 204 ranks the plurality of ephemeral prompts generated in operation 501, based on a determined likelihood of physical interaction between the given member and each of the additional members. In operation 503, the prompt management module 204 displays the ranked ephemeral prompts (that were ranked in operation 502) to the given member. It is contemplated that the operations of method 500 may incorporate any of the other features disclosed herein. Various operations in the method 500 may be omitted or rearranged, as necessary.

Figure 6:
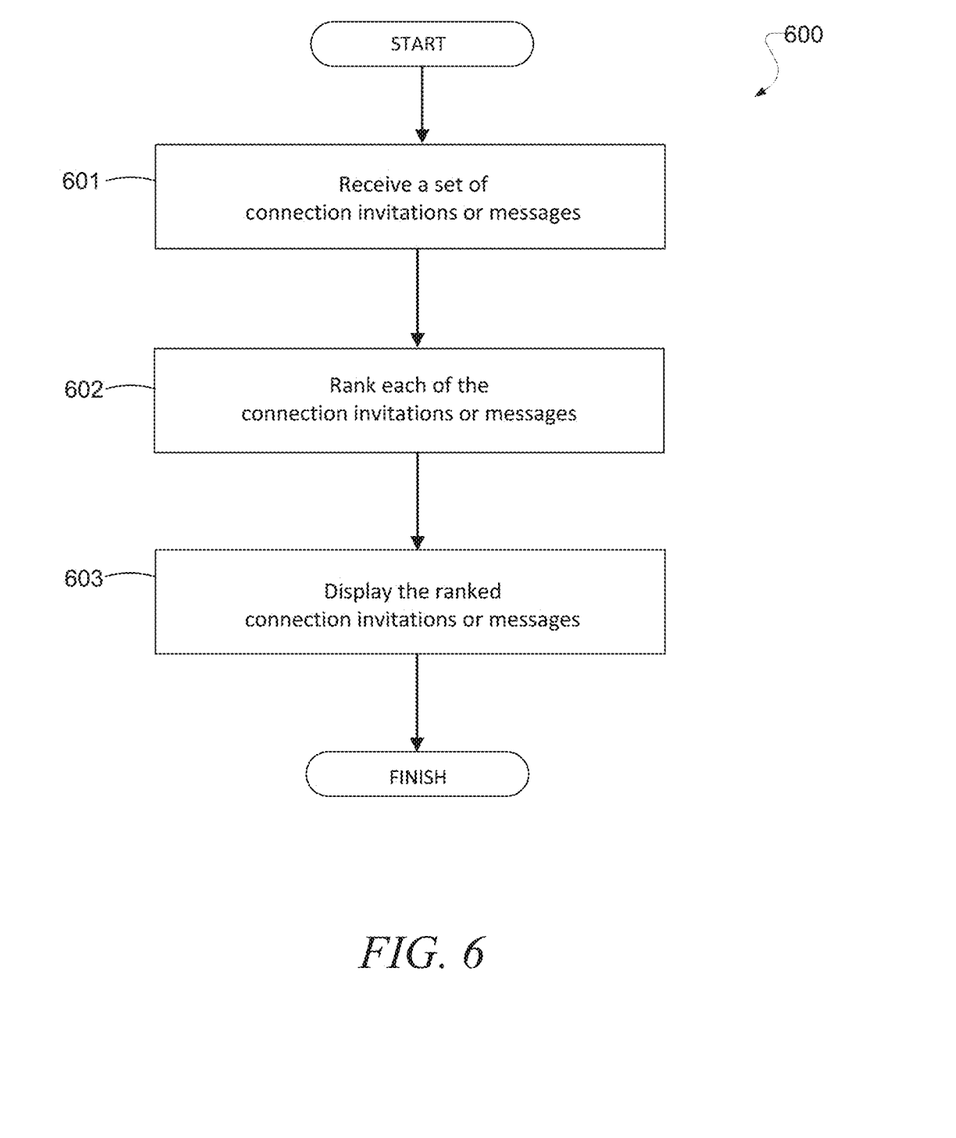
FIG. 6 is a flowchart illustrating an example method, according to various embodiments.

FIG. 6 is a flowchart illustrating an example method 600, consistent with various embodiments described herein. The method 600 may be performed at least in part by, for example, the ephemeral interaction system 200 illustrated in FIG. 2 (or an apparatus having similar modules, such as one or more client machines or application servers). In operation 601, the determination module 202 receives, at a device of a given member, a set of connection invitations or messages directed to the given member. In operation 602, the determination module 202 ranks each of the connection invitations or messages received in operation 601, based on a determined likelihood of physical interaction between a sender of each connection invitation or message and the given member. In operation 603, the determination module 202 displays the ranked connection invitations or messages (that were ranked in operation 602) to the given member. It is contemplated that the operations of method 600 may incorporate any of the other features disclosed herein. Various operations in the method 600 may be omitted or rearranged, as necessary.

In some embodiments, the determination module 202 may gather various types of analytic data for the purposes of minimizing inaccurate or "false positive" determinations of physical interactions. For example, suppose that a user walks into a cafeteria during lunchtime, and thus their mobile device is located close to a large number of mobile devices of other users for an extended period of time. It is possible that the user may receive a large number of prompts based on these apparent interactions, even though the user is merely moving through the crowd and may not actually be interacting with the other users. Accordingly, if the determination module 202 determines that a large number of mobile devices are located in a given location at the same time every day, then it is less likely that these are not actual interactions, and the determination module 202 may determine that these are not physical interactions. The determination module 202 may detect how many mobile devices are at or near (e.g., within a predetermined distance of) a given location, using any techniques known to those skilled in the art, including comparing and analyzing location data obtained from a geo-location system of each mobile device, a global positioning system (GPS) of each mobile device, a near field communication (NFC) system of each mobile device, a Bluetooth system of each mobile device, etc.

In some embodiments, the determination module 202 may apply a feedback loop based on the click through rates of previous prompts, in order to help determine whether similar future prompts correspond to physical interactions. For instance, using the previous example, if the ephemeral interaction system 200 generates prompts for each of the other users in the cafeteria, and if the user does not click on any of the prompts, then the ephemeral interaction system 200 may utilize this implicit feedback to determine that these are not physical interactions, and the next time the user is at the given location at the same time, the determination module 202 will determine that these are not physical interactions (or may apply heightened criteria in order to detect physical interactions, such as the user's mobile device being located in closer proximity to other devices for a longer period of time). On the other hand, if the ephemeral interaction system 200 generates prompts for each of the other users in the cafeteria, and the users clicks many of the prompts, then the ephemeral interaction system 200 may utilize this feedback to determine that these are physical interactions, and the next time the user is at the given location at the same time, the determination module 202 will determine that these are physical interactions (or may apply less stringent criteria in order to detect physical interactions, such as the user's mobile device being located farther from other devices for a shorter period of time).

In some embodiments, during the specific ephemeral time interval (e.g., 24 hours) after the users have physically interacted, the system dynamically adjusts or lowers the threshold for communication or connection between the members on the online social networking service, providing a light-weight, relaxed, or otherwise easier user flow for interaction for a limited time than would otherwise be the case. After expiration of the ephemeral time interval, default interaction or privacy settings are restored.

Figure 7:
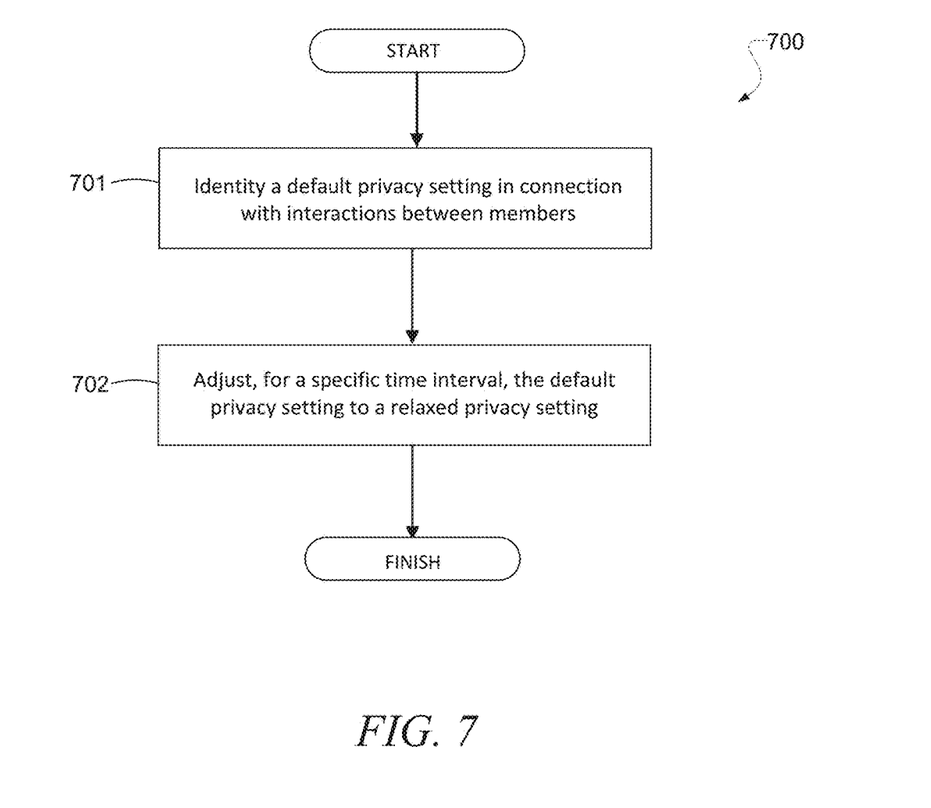
FIG. 7 is a flowchart illustrating an example method, according to various embodiments.

For example, FIG. 7 is a flowchart illustrating an example method 700, consistent with various embodiments described herein. The method 700 may be performed at least in part by, for example, the ephemeral interaction system 200 illustrated in FIG. 2 (or an apparatus having similar modules, such as one or more client machines or application servers). In operation 701, the prompt management module 204 identifies a default privacy setting in connection with interactions between a first member and a second member via the online social networking service. In operation 702, the prompt management module 204 adjusts, for a specific ephemeral time interval described herein, the default privacy setting (identified in operation 701) to a relaxed privacy setting in connection with interactions between the first member and the second member. For example, in some embodiments, the default privacy setting prohibits messages from the first member to the second member, and the relaxed privacy setting permits messages from the first member to the second member. As another example, in some embodiments, the default privacy setting prohibits connection requests from the first member to the second member, and the relaxed privacy setting permits connection requests from the first member to the second member. As another example, in some embodiments, the default privacy setting prohibits the first member from viewing a member profile page of the second member, and the relaxed privacy setting permits the first member to view the member profile page of the second member. As another example, in some embodiments, the default privacy setting prohibits the first member from viewing one or more components of a member profile page of the second member, and the relaxed privacy setting permits the first member to view the components of the member profile page of the second member. It is contemplated that the operations of method 700 may incorporate any of the other features disclosed herein. Various operations in the method 700 may be omitted or rearranged, as necessary.

In some embodiments, the prompt management module 204 may display a settings user interface and receive, via the settings user interface, a user specification of various settings that may be stored in the database 206. For example, the user may specify that they should or should not appear (or be mentioned or described in) in ephemeral prompts. As another example, the user may specify that they should or should not appear (or be mentioned or described) in ephemeral prompts describing interactions occurring during a specified time period (e.g., today). As another example, the user may specify that they user should or should not appear (or be mentioned or described) in ephemeral prompts describing interactions at a specified location (e.g., company headquarters). As another example, the user may specify that they should or should not appear in (or be mentioned or described) ephemeral prompts describing interactions during a specified event (e.g., a conference). As another example, the user may specify that they should or should not appear (or be mentioned or described) in ephemeral prompts displayed to member connections of a specified degree ($1^{st}$ degree connections). As another example, the user may specify that they user should or should not appear (or be mentioned or described) in ephemeral prompts displayed to members having specified member profile attributes (e.g., members associated with a specific company, job title, geo-location, etc.). Examples of member profile attributes are location, role, industry, language, current job, employer, experience, skills, education, school, endorsements, seniority level, company size, connections, connection count, account level, name, username, social media handle, email address, phone number, fax number, resume information, title, activities, group membership, images, photos, preferences, news, status, links or URLs on a profile page, and so forth.

In some embodiments, the prompt management module 204 may receive, from a member, a user specification of an ephemeral status message, and the prompt management module 204 display the ephemeral status message in any ephemeral prompt that describes the member (e.g., in one of the prompts 401-403 in FIG. 4). In this way, the user may curate content specific to a meeting that provides a viewer of the prompt some context as to the meeting. For example, when a recruiter is at a job fair, the recruiter may specify an ephemeral status message describing information about the recruiter, the types of candidates they are looking for, the types of jobs that are available, and so forth. Thus, when the ephemeral interaction system 200 determines that another user has physically interacted with the recruiter, the prompt displayed on the other user's mobile device will include this ephemeral status message.

Example Mobile Device

Figure 8:
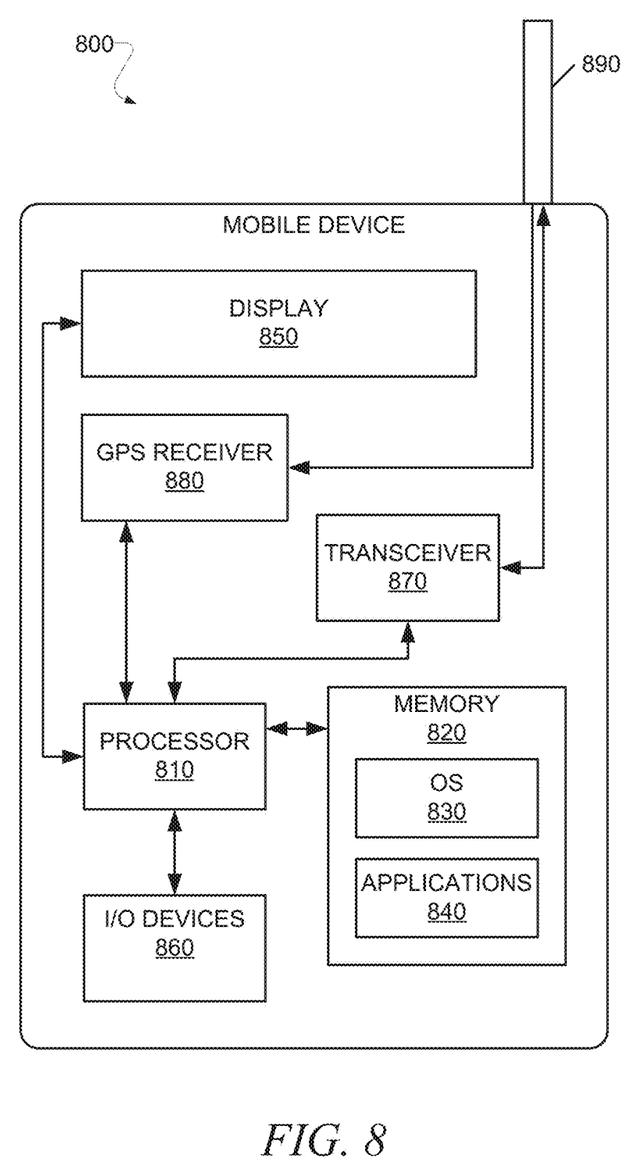
FIG. 8 illustrates an example mobile device, according to various embodiments.

FIG. 8 is a block diagram illustrating the mobile device 800, according to an example embodiment. The mobile device may correspond to, for example, one or more client machines or application servers. One or more of the modules of the system 200 illustrated in FIG. 2 may be implemented on or executed by the mobile device 800. The mobile device 800 may include a processor 810. The processor 810 may be any of a variety of different types of commercially available processors suitable for mobile devices (for example, an XScale architecture microprocessor, a Microprocessor without Interlocked Pipeline Stages (MIPS) architecture processor, or another type of processor). A memory 820, such as a Random Access Memory (RAM), a Flash memory, or other type of memory, is typically accessible to the processor 810. The memory 820 may be adapted to store an operating system (OS) 830, as well as application programs 840, such as a mobile location enabled application that may provide location based services to a user. The processor 810 may be coupled, either directly or via appropriate intermediary hardware, to a display 850 and to one or more input/output (I/O) devices 860, such as a keypad, a touch panel sensor, a microphone, and the like. Similarly, in some embodiments, the processor 810 may be coupled to a transceiver 870 that interfaces with an antenna 890. The transceiver 870 may be configured to both transmit and receive cellular network signals, wireless data signals, or other types of signals via the antenna 890, depending on the nature of the mobile device 800. Further, in some configurations, a GPS receiver 880 may also make use of the antenna 890 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
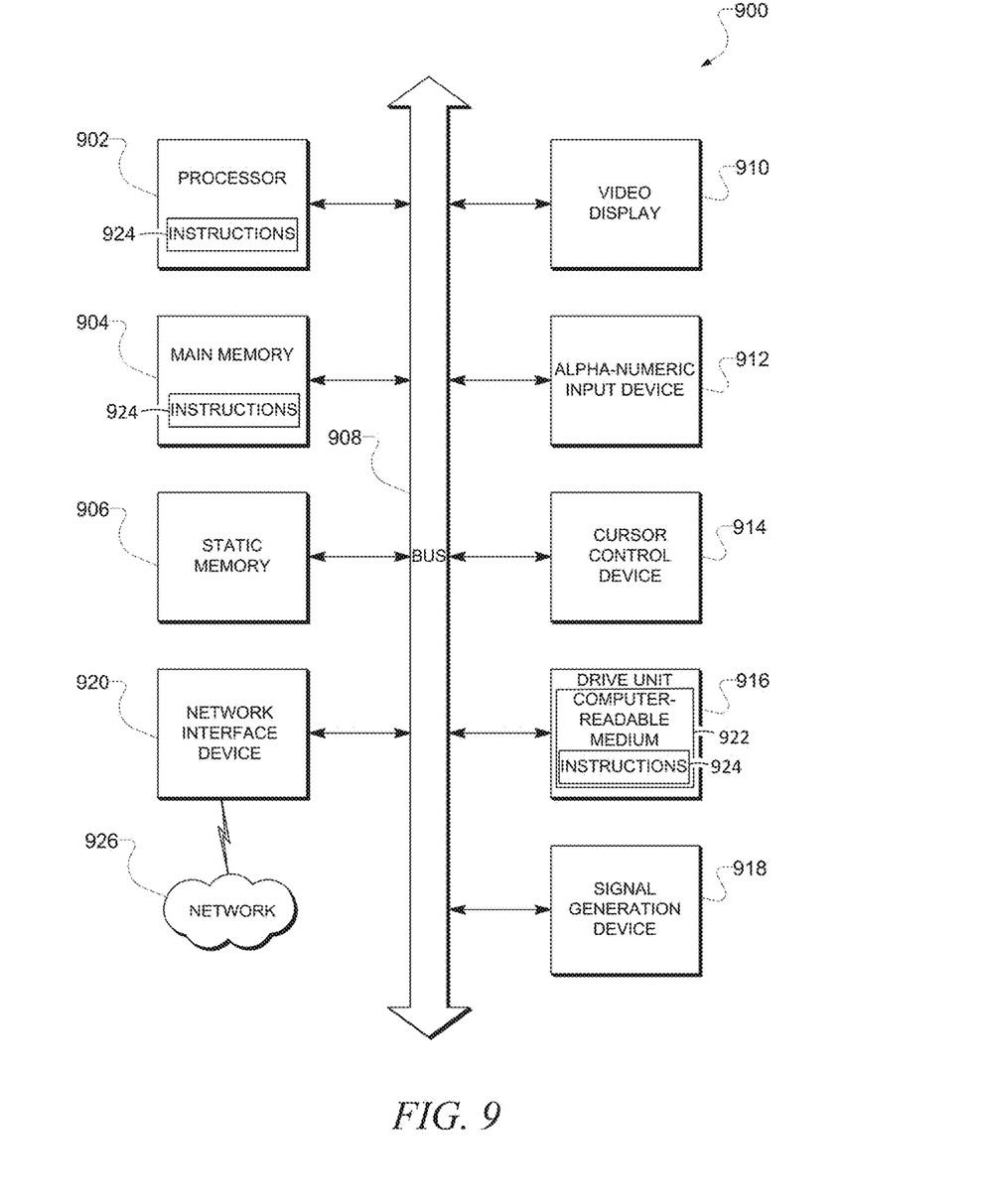
FIG. 9 is a diagrammatic representation of a machine in the example form of a computer system within which a set of instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining that a first member and a second member of an online social networking service physically interacted at an interaction location at an interaction time;
   responsive to said determining step, calculating a specific time interval commencing at the interaction time, the specific time interval defining a duration of time during which privacy rule thresholds for the first member and the second member to communicate and/or establish a formal connection are lowered;
   displaying to the first member, during the specific time interval, via a user interface, an ephemeral prompt indicating that the first member physically interacted with the second member, and inviting the first member to message the second member via the online social networking service; and
   preventing the ephemeral prompt from being displayed subsequent to expiration of the specific time interval.

2. The method of claim 1, further comprising:
   preventing the first member from connecting to or messaging the second member subsequent to expiration of the specific time interval.

3. The method of claim 1, wherein the ephemeral prompt identifies the second member, the interaction time, the interaction location, a link to view a member profile page of the second member, a link to message the second member, and a link to connect to the second member.

4. The method of claim 1, further comprising:
   detecting that the first member has selected, during the specific time interval, a link in the ephemeral prompt to message or connect to the second member; and
   transmitting the message or a connection invitation to the second member, wherein the message identifies the first member, the interaction time, the interaction location, a link to view a member profile page of the first member, or a link to accept the connection invitation from the first member.

5. The method of claim 1, wherein the determining that the first member and the second member physically interacted is based on data obtained from a geo-location system, a near field communication (NFC) system, or a Bluetooth system installed in a mobile device associated with the first member or second member.

6. The method of claim 1, wherein the determining comprises determining that the first member and the second member are listed on a check-in status message posted on an online social network, the check-in status message having a check-in location and check-in meeting time corresponding to the interaction location and interaction time.

7. The method of claim 1, wherein the determining comprises determining that the first member and the second member are listed on an electronic calendar invite associated with a meeting location and meeting time corresponding to the interaction location and interaction time.

8. The method of claim 1, further comprising receiving, via a settings user interface, a user specification of physical interaction criteria for detecting physical interactions between members, the physical interaction criteria corresponding to at least one of a requisite physical interaction distance and a requisite physical interaction time,
   wherein the determining that the first member and the second member physically interacted comprises determining that the first member was located within the requisite physical interaction distance of the second member for the requisite physical interaction time.

9. The method of claim 1, further comprising:
   generating a plurality of ephemeral prompts indicating that the first member physically interacted with a plurality of additional members, and inviting the first member to message the plurality of additional members via the online social networking service; and
   ranking the plurality of ephemeral prompts, based on a determined likelihood of physical interaction between the first member and each of the additional members; and
   displaying the ranked set of ephemeral prompts to the first member.

10. The method of claim 1, further comprising:
    receiving, at a device of the second member, a set of connection invitations or messages directed to the second member,
    ranking each of the connection invitations or messages, based on a determined likelihood of physical interaction between a sender of each connection invitation or message and the second member; and
    displaying the ranked set of connection invitations or messages to the second member.

11. The method of claim 1, further comprising:
    identifying a default privacy setting in connection with interactions between the first member and the second member via the online social networking service; and
    adjusting, for the specific time interval, the default privacy setting to a relaxed privacy setting in connection with interactions between the first member and the second member.

12. The method of claim 1, wherein the default privacy setting prohibits messages from the first member to the second member, and the relaxed privacy setting permits messages from the first member to the second member.

13. The method of claim 1, wherein the default privacy setting prohibits connection requests from the first member to the second member, and the relaxed privacy setting permits connection requests from the first member to the second member.

14. The method of claim 1, wherein the default privacy setting prohibits the first member from viewing a member profile page of the second member, and the relaxed privacy setting permits the first member to view the member profile page of the second member.

15. The method of claim 1, wherein the default privacy setting prohibits the first member from viewing one or more components of a member profile page of the second member, and the relaxed privacy setting permits the first member to view the components of the member profile page of the second member.

16. The method of claim 1, further comprising:
    receiving, from the second member, a user specification of an ephemeral status message; and
    displaying the ephemeral status message in the ephemeral prompt.

17. A system comprising:
    a processor;
    a memory device holding an instruction set executable on the processor to cause the computer system to perform operations comprising:

determining that a first member and a second member of an online social networking service physically interacted at an interaction location at an interaction time by determining that the first member and the second member are listed on a check-in status message posted to an online social networking service;

calculating a specific time interval commencing at the interaction time;

displaying to the first member, during the specific time interval, via a user interface, an ephemeral prompt indicating that the first member physically interacted with the second member, and inviting the first member to message the second member via the online social networking service; and preventing the ephemeral prompt from being displayed subsequent to expiration of the specific time interval.

18. The system of claim 17, wherein the operations further comprise:

preventing the first member from connecting to or messaging the second member subsequent to expiration of the specific time interval.

19. A non-transitory machine-readable storage medium comprising instructions that, when executed by one or more processors of a machine, cause the machine to perform operations comprising:

determining that a first member and a second member of an online social networking service physically interacted at an interaction location at an interaction time by determining that the first member and second member are listed together on an electronic calendar invitation associated with a meeting location and meeting time consistent with the interaction location and interaction time;

calculating a specific time interval commencing at the interaction time;

displaying to the first member, during the specific time interval, via a user interface, an ephemeral prompt indicating that the first member physically interacted with the second member, and inviting the first member to message the second member via the online social networking service; and preventing the ephemeral prompt from being displayed subsequent to expiration of the specific time interval.

20. The storage medium of claim 19, wherein the operations further comprise:

preventing the first member from connecting to or messaging the second member subsequent to expiration of the specific time interval.

* * * * *